United States Patent
Woltman et al.

(10) Patent No.: US 11,006,644 B2
(45) Date of Patent: May 18, 2021

(54) CUTTING UNIT FOR CUTTING MEAT PARTS FROM SUSPENDED PREVIOUSLY EVISCERATED POULTRY CARCASSES

(71) Applicant: Foodmate B.V., Numansdorp (NL)

(72) Inventors: Gerrit Hendrik Woltman, Numansdorp (NL); Rijk Slagboom, Numansdorp (NL); David Scott Hazenbroek, Numansdorp (NL)

(73) Assignee: Foodmate B.V., Numansdorp (NL)

( * ) Notice: Subject to any disclaimer, the term of this patent is extended or adjusted under 35 U.S.C. 154(b) by 0 days.

(21) Appl. No.: 16/615,998

(22) PCT Filed: May 25, 2018

(86) PCT No.: PCT/NL2018/050344
§ 371 (c)(1),
(2) Date: Nov. 22, 2019

(87) PCT Pub. No.: WO2018/217090
PCT Pub. Date: Nov. 29, 2018

(65) Prior Publication Data
US 2020/0138048 A1 May 7, 2020

(30) Foreign Application Priority Data
May 26, 2017 (NL) .................................. 2018984

(51) Int. Cl.
*A22C 21/00* (2006.01)
(52) U.S. Cl.
CPC ........ *A22C 21/003* (2013.01); *A22C 21/0007* (2013.01); *A22C 21/0053* (2013.01)

(58) Field of Classification Search
CPC . A22C 21/00; A22C 21/0007; A22C 21/0023; A22C 21/003
(Continued)

(56) References Cited

U.S. PATENT DOCUMENTS

| 5,947,811 A | 7/1999 | Hazenbroek et al. |
| 6,322,438 B1 * | 11/2001 | Barendregt ........ A22C 21/0023 |
| | | 452/155 |

(Continued)

FOREIGN PATENT DOCUMENTS

| EP | 2 329 721 A1 | 6/2011 |
| WO | WO 2017-131513 A1 | 8/2017 |

*Primary Examiner* — Richard T Price, Jr.
(74) *Attorney, Agent, or Firm* — Womble Bond Dickinson (US) LLP

(57) ABSTRACT

A Cutting unit and method for cutting meat parts from suspended previously eviscerated poultry carcasses, when the carcasses are each suspended upside-down by their legs from a shackle in an overhead conveyor that transports a succession of shackles through poultry cut-up apparatus. The cutting unit includes at least one cutting element. The cutting unit includes a guiding and positioning member for guiding and positioning a predetermined portion of a poultry carcass in respect of the at least one cutting element. The guiding and positioning member is associated with an auxiliary conveyor adapted to move synchronously with shackles in an overhead conveyor. The auxiliary conveyor has an endless chain articulated about first and second return sprocket. The articulated chain moves in a vertical plane parallel to a vertical plane common to a path of movement of the conveyor shackles.

20 Claims, 14 Drawing Sheets

(58) Field of Classification Search
USPC .............................. 452/149, 160, 166, 167
See application file for complete search history.

(56) References Cited

U.S. PATENT DOCUMENTS

| | | | |
|---|---|---|---|
| 6,475,076 B1* | 11/2002 | Rheingans | A22C 21/0023 452/166 |
| 8,961,274 B1 | 2/2015 | den Boer et al. | |
| 2003/0181157 A1 | 9/2003 | Annema et al. | |
| 2008/0176499 A1* | 7/2008 | Koops | A22B 3/06 452/53 |
| 2012/0190285 A1* | 7/2012 | Hazenbroek | A22C 21/0023 452/169 |

* cited by examiner

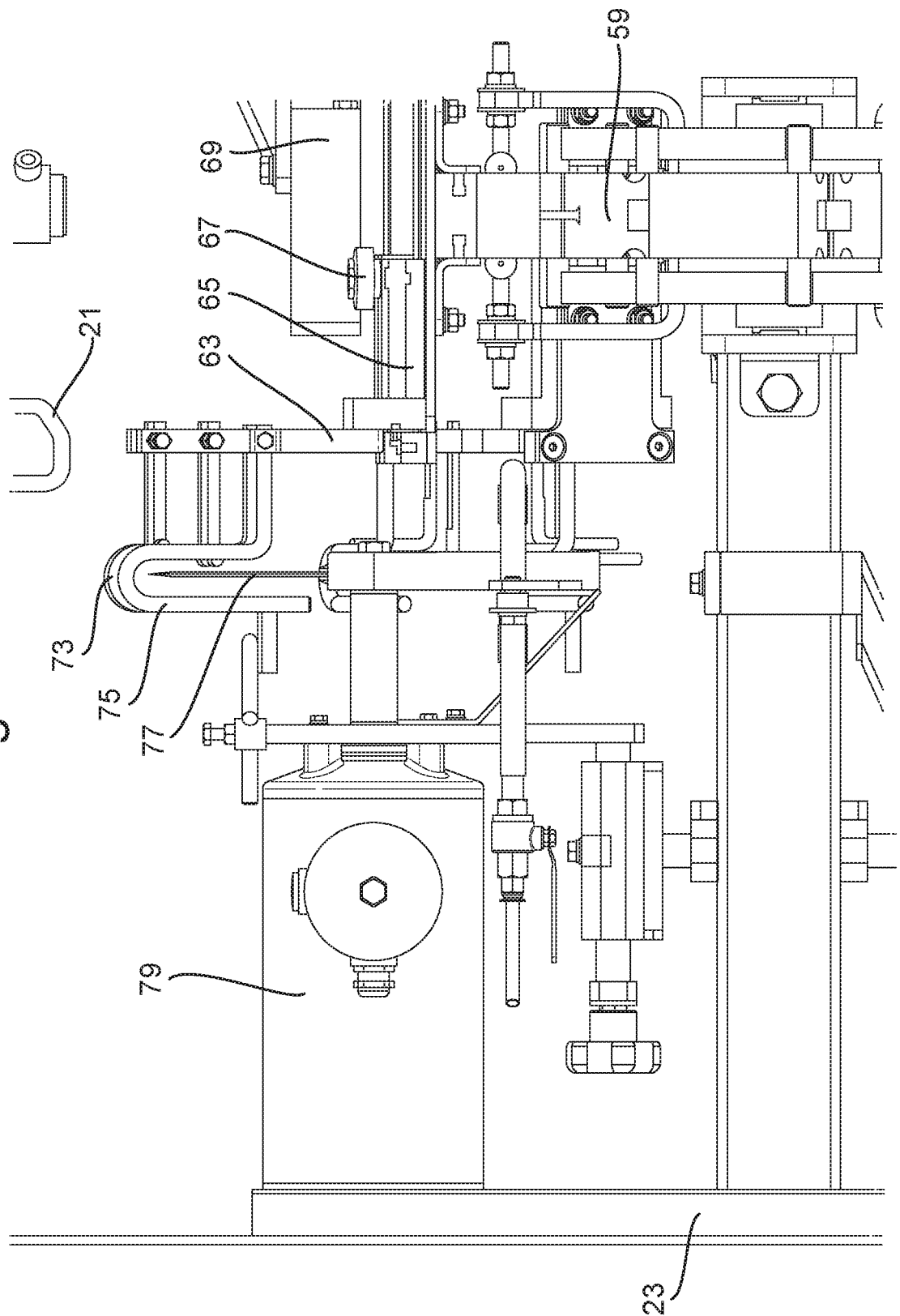

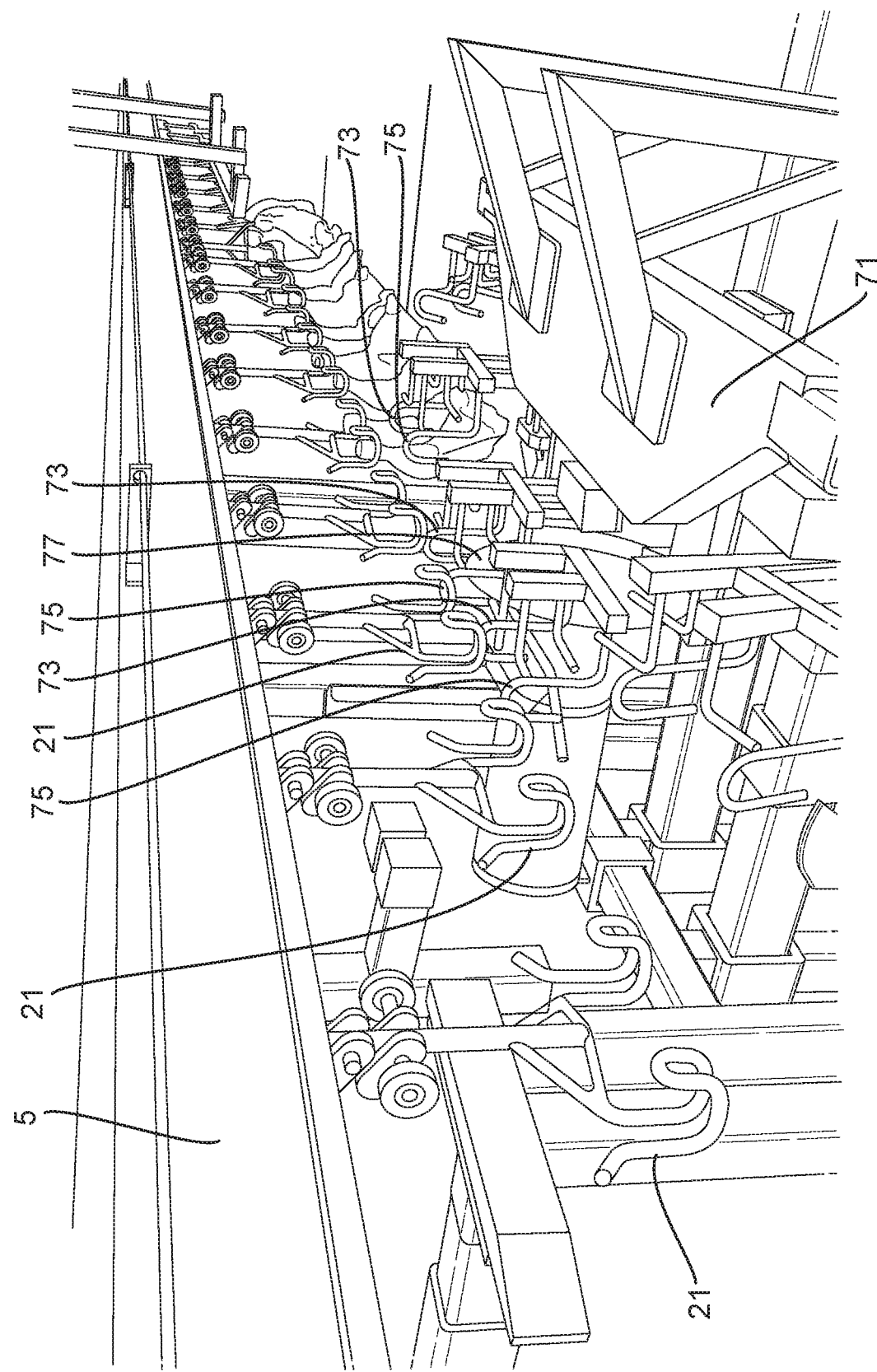

CUTTING UNIT FOR CUTTING MEAT PARTS FROM SUSPENDED PREVIOUSLY EVISCERATED POULTRY CARCASSES

FIELD OF THE INVENTION

The invention relates to a cutting unit for cutting meat parts from suspended previously eviscerated poultry carcasses, when the carcasses are each suspended upside-down by their legs from a shackle in an overhead conveyor that transports a succession of shackles through poultry cut-up apparatus.

BACKGROUND TO THE INVENTION

In the automatic processing of poultry carcasses for human consumption, it has become common practice to suspend the poultry carcasses in an inverted position hanging from their legs and to perform as many processing steps, including evisceration and cutting up, without removing the poultry carcasses from the conveyor shackles. It is also a known problem that a freely suspended poultry carcass is more difficult to position accurately for cutting. This cutting difficulty not only results from difficulties to support the moving carcasses in sequential cutting units, but also stems from variations in size of the poultry carcasses. Various guiding and positioning means have already been developed and put into use to improve cutting accuracy. While various of such guiding and positioning means have to some extent achieved an acceptable cutting accuracy, the demands from retail, food chains, and consumers have substantially increased over the past years. These increased retail, food chain, and consumer demands are conflicting in that these require both an increased processing speed, as well as a more accurate cutting to totally eliminate bone fragments from the obtained meat parts.

SUMMARY OF THE INVENTION

It is an object of the present invention to propose, and embodiments of the present invention seek to provide, a still further improved cutting unit for a poultry cut-up apparatus. In a more general sense it is thus an object of the invention to overcome or reduce at least one of the disadvantages of the prior art. It is also an object of the present invention to provide alternative solutions which are less cumbersome in assembly and operation and which moreover can be made relatively inexpensively. Alternatively it is an object of the invention to at least provide a useful alternative.

To this end the invention provides a cutting unit as defined in one or more of the appended claims.

According to an aspect is provided a cutting unit for cutting meat parts from suspended previously eviscerated poultry carcasses, when the carcasses are each suspended upside-down by their legs from a shackle in an overhead conveyor that transports a succession of shackles through poultry cut-up apparatus. The cutting unit includes at least one cutting element. The cutting unit includes a guiding and positioning member for guiding and positioning a predetermined portion of a poultry carcass in respect of the at least one cutting element. The guiding and positioning member can be associated with an auxiliary conveyor. The auxiliary conveyor can be arranged to move synchronously with the shackles in the overhead conveyor. The guiding and positioning member can be arranged to move synchronously with the shackles. Hence, the guiding and positioning member can move at the same speed as the carcass, or part thereof, suspending from the shackle. The guiding and positioning member can be arranged to move in a vertical plane parallel to a vertical plane common to a path of movement of the conveyor shackles. Hence, the guiding and positioning member can move at a constant height relative to the carcass, or part thereof, or at a controlled or controllable height relative to the carcass or part thereof. With said guiding and positioning member aiding in positioning of the carcass, or a part thereof, the cutting unit can cut animal parts, such as poultry breasts and/or poultry legs, in substantially equally divided portions regarding weight and/or size.

The auxiliary conveyor can have an endless chain articulated about first and second return sprockets. The articulated chain moves in a vertical plane parallel to a vertical plane common to a path of movement of the conveyor shackles.

Optionally, the cutting element is a rotating cutter blade. Optionally, the rotating cutter blade rotates in a vertical plane.

The cutting unit can be a leg cutter unit, and the guiding and positioning member can be a leg positioning guide for positioning, e.g. a thigh portion of, the leg in respect of the, e.g. vertically, rotating cutter blade.

Optionally, the leg positioning guide is additionally arranged for movement laterally of the vertical plane.

Optionally, the rotating cutter blade rotates in a horizontal plane. The horizontally rotating cutter blade can be part of a pair of opposite rotary cutter blades.

The cutting unit can be a breast cutting unit. The cutting unit can be a breast cutter unit, and the guiding and positioning member can be a guiding and locating member for locating and guiding a breast portion between the pair of opposite rotary cutter blades.

Optionally, the cutting unit is a leg cutter unit, including a rotating cutter blade arranged to rotate in a horizontal plane (or a pair of opposite horizontally rotating cutter blades). The guiding and positioning member can include a leg positioning guide for positioning a thigh and drumstick portion of the leg in respect of the horizontally rotating cutter blade(s). The horizontally rotating cutter blade(s) can separate the drumstick from the thigh portion of the leg.

Optionally, the cutting unit is a leg cutter unit, including a first rotating cutter blade arranged to rotate in a vertical plane, and a second rotating cutter blade arranged to rotate in a horizontal plane (or a pair of opposite horizontally rotating cutter blades). The guiding and positioning member can include a leg positioning guide for positioning a thigh and drumstick portion of the leg in respect of the horizontally rotating cutter blade(s) and a leg positioning guide for positioning a thigh portion of the leg in respect of the vertically rotating cutter blade. The horizontally rotating cutter blade(s) can separate the drumstick from the thigh portion of the leg. The vertically rotating cutter blade can cut the thigh portion in two parts, e.g. two halves.

Optionally, the guiding and positioning member includes a triangular portion arranged for engaging between the breast halves of the carcass, e.g. of a carcass previously cut in two carcass halves along a mid-sagittal plane. Optionally, the guiding and locating member includes a backup plate arranged for maintaining the carcass (halves) upstream of the backup plate.

According to an aspect is provided an automatic poultry cut-up apparatus including a cutting unit as described above.

According to an aspect is provided a method for cutting meat parts from suspended previously eviscerated poultry carcasses, when the carcasses are each suspended upside-down by their legs from a shackle in an overhead conveyor that transports a succession of shackles through poultry cut-up apparatus. The method includes transporting, using the shackles, a suspended carcass past at least one cutting element. The method includes guiding and positioning a predetermined portion of the carcass in respect of the at least one cutting element using a guiding and positioning member associated with an auxiliary conveyor adapted to move synchronously with the shackles. Optionally, the guiding and positioning member moves synchronously with the shackles.

According to an aspect is provided a method for cutting meat parts from suspended previously eviscerated poultry carcasses in substantially equally divided portions regarding weight and/or size, when the carcasses are each suspended upside-down by their legs from a shackle in an overhead conveyor that transports a succession of shackles through poultry cut-up apparatus. The method can e.g. include cutting poultry parts, such as poultry breasts and/or poultry legs, in substantially equally divided portions regarding weight and/or size. The method includes transporting, using the shackles, a suspended carcass past at least one cutting element. The method includes guiding and positioning a predetermined portion of the carcass in respect of the at least one cutting element using a guiding and positioning member associated with an auxiliary conveyor adapted to move synchronously with the shackles. Optionally, the guiding and positioning member moves synchronously with the shackles.

Optionally, the auxiliary conveyor has an endless chain articulated about first and second return sprockets.

Optionally, the articulated chain moves in a vertical plane parallel to a vertical plane common to a path of movement of the conveyor shackles.

Optionally, the guiding and positioning member moves in a vertical plane parallel to a vertical plane common to a path of movement of the conveyor shackles.

Optionally, the cutting element includes a vertically rotating cutter blade.

Optionally, the cutting element, includes a horizontally rotating cutter blade, or a pair of horizontally rotating cutter blades.

Optionally, the method includes cutting meat parts from breast portions of the carcasses, e.g. by the transverse cutting of the depending breast halves.

Optionally, the method includes cutting a thigh portion of legs of the carcasses in two parts, e.g. two halves.

Optionally, the method includes separating a thigh portion from a drumstick of legs of the carcasses.

The cutting unit for cutting meat parts from suspended previously eviscerated poultry carcasses in accordance with the invention can include at least one cutting element; and a guiding and positioning member for guiding and positioning a predetermined portion of a poultry carcass in respect of the at least one cutting element. In this cutting unit the guiding and positioning member is advantageously associated with an auxiliary conveyor, which is adapted to move synchronically with shackles in an overhead conveyor. The auxiliary conveyor preferably has an endless chain articulated about first and second return sprockets, and the articulated chain is arranged to move in a vertical plane parallel to a vertical plane common to a path of movement of the conveyor shackles. Such an arrangement makes it easy to accurately position the guiding and positioning members with respect to an overhead shackle carrying a poultry carcass portion. This positioning and guiding can also be accomplished rapidly and reliable, whereby processing speed and accuracy can be substantially improved.

It will be appreciated that any one or more of the above aspects, features and options can be combined. It will be appreciated that any one of the options described in view of one of the aspects can be applied equally to any of the other aspects. It will also be clear that all aspects, features and options described in view of the cutting unit apply equally to the methods, and vice versa.

BRIEF DESCRIPTION OF THE DRAWING

The invention will further be elucidated on the basis of exemplary embodiments which are represented in a drawing. The exemplary embodiments are given by way of non-limitative illustration. In the drawing:

FIG. 10A is an intermediate cross section of the leg cutting unit seen in the direction of conveyance (arrow A) of FIGS. 8 and 9;

FIG. 13 is yet another view of the unit of FIGS. 8-12 in operation.

DETAILED DESCRIPTION

Figure 1:
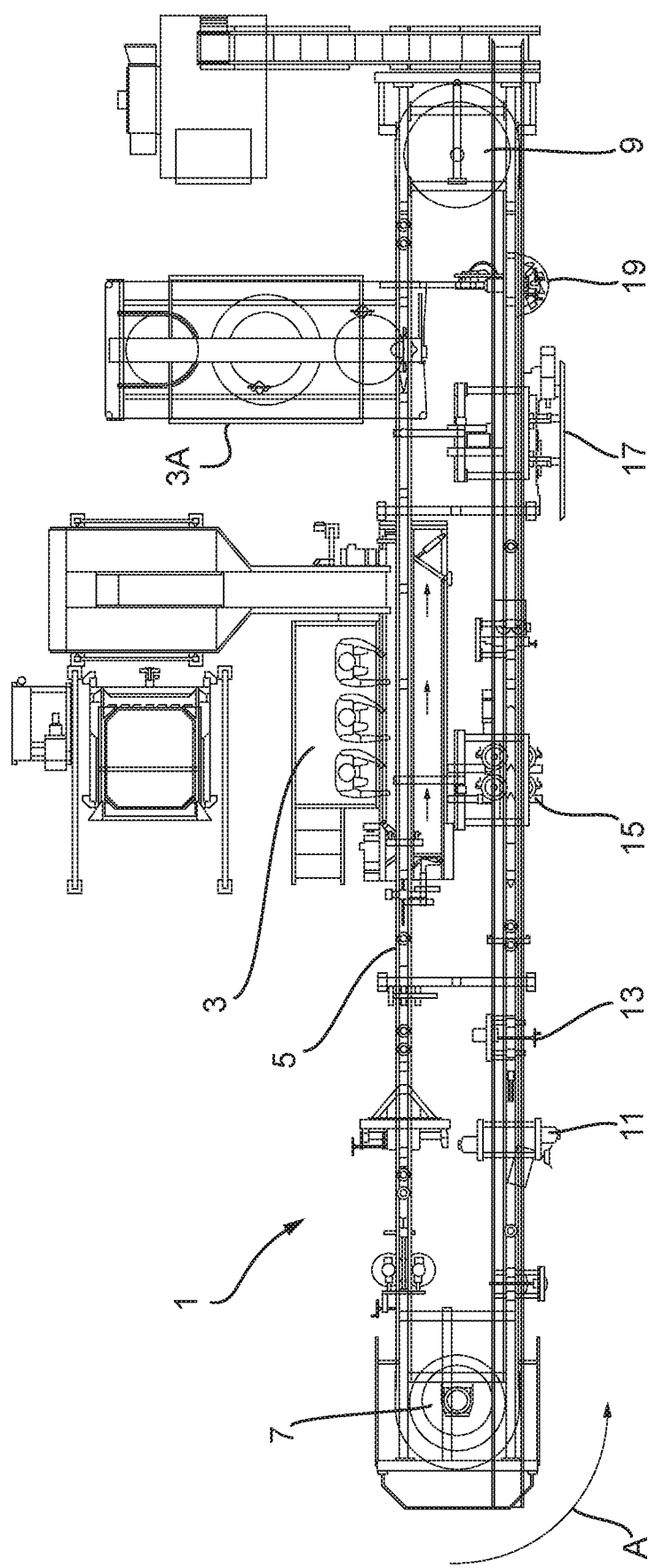
FIG. 1 is a plan view of a fully automatic poultry carcass cut-up apparatus that includes a breast cutting unit and a leg cutting unit.

As seen in FIG. 1, a fully automatic poultry cut-up apparatus 1, seen in plan view, includes a loading section 3. At the loading section manual labour is used to suspend previously eviscerated poultry carcasses in an inverted position from shackles (not visible in FIG. 1, but conventional). Alternatively, or additionally, an automatic loading station 3A can be included for automatically suspending poultry carcasses from the shackles. The poultry carcasses are hung from the shackles by their legs, and the shackles are transported by an endless overhead conveyor 5 in a conveyance direction A. The overhead conveyor 5 extends in a closed loop about a driven first return sprocket 7, and an idle second return sprocket 9. In the example of FIG. 1 the overhead conveyor 5 is divided in two parallel stretches, one of which extends through the loading section 3, and the other extending opposite of the loading section 3. In this example, several cutting stations are arranged along the section of the conveyor 5 that is opposite to the loading section 3. At a wing cutting unit 11 wing parts are cut from the invertedly suspended poultry carcasses. The wing cutting unit 11 can be of a variety as disclosed in U.S. Pat. No. 8,430,827 or like.

Directly downstream of the wing cutting unit 11 the now wingless carcasses advance into a breast splitting unit 13, which again can be a conventional unit as described in U.S. Pat. No. 4,896,399, 4,468,838 or 8,535,122 or like. The breast splitting unit 13 is followed by a special breast cutter unit 15, and following then by a special thigh cutter unit 17. A last cutting unit along the conveyor or stretch opposite the loading station 3 is a thigh/drumstick separator 19. The thigh/drumstick separator can be of a variety as disclosed in U.S. Pat. No. 4,896,399 or like. It will be appreciated that not all cutting stations 11, 13, 15, 17, 19 need be present, depending on the desired cutting of the carcass.

Figure 2:
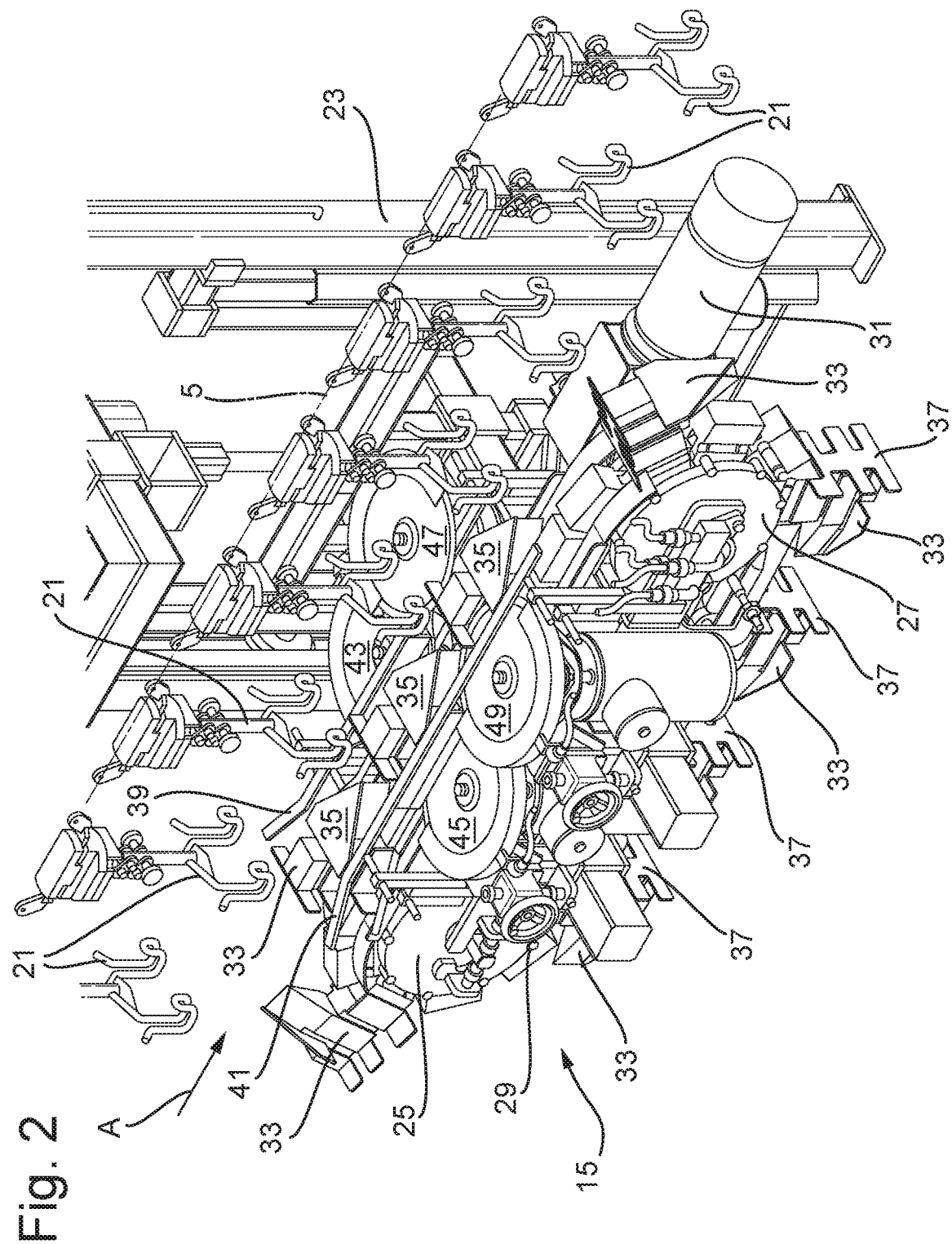
FIG. 2 is an isometric view of a breast cutting unit in accordance with the invention.
Figure 3:
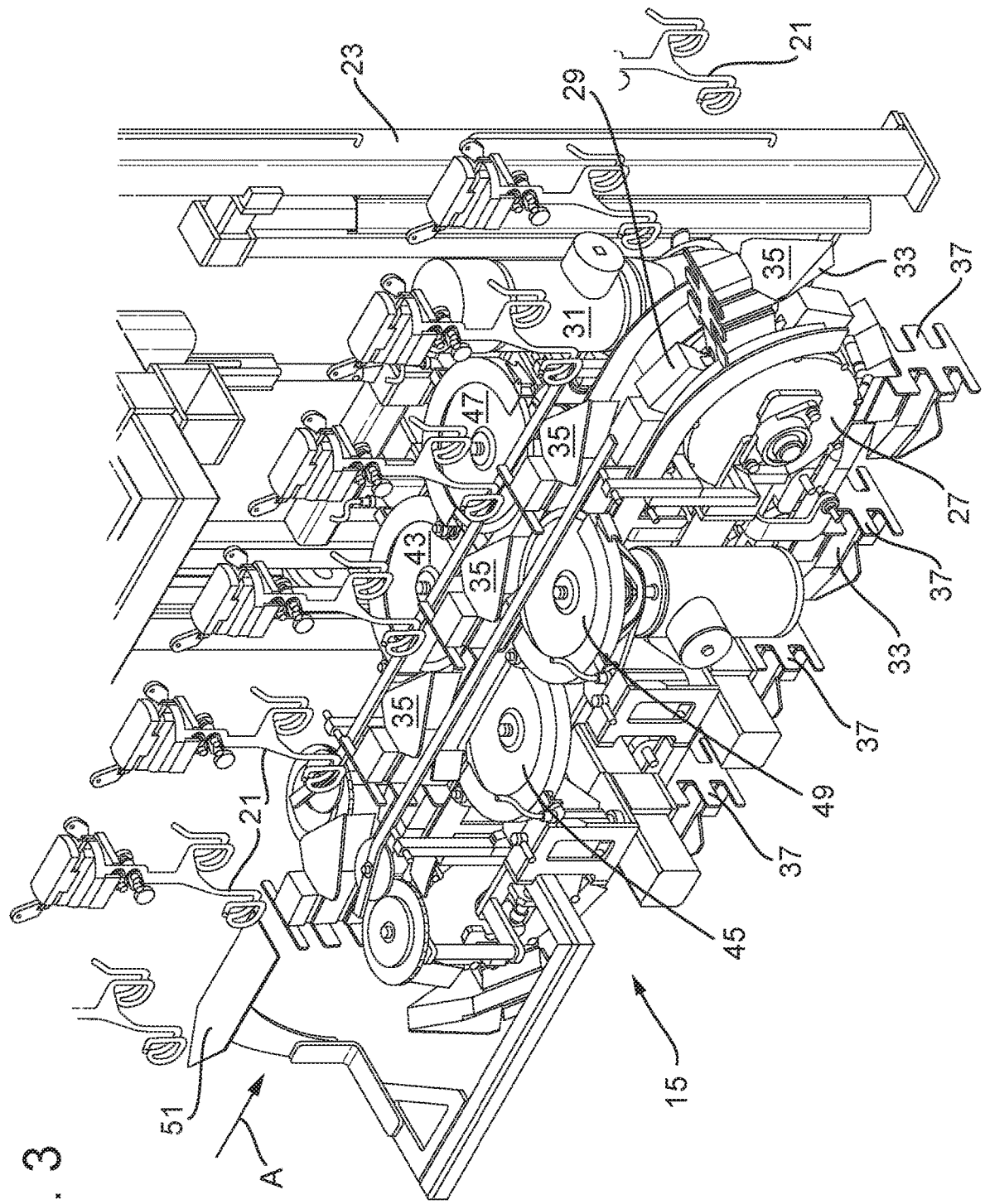
FIG. 3 is a similar view as in FIG. 2, but now with an addition entrance guide.
Figure 4:
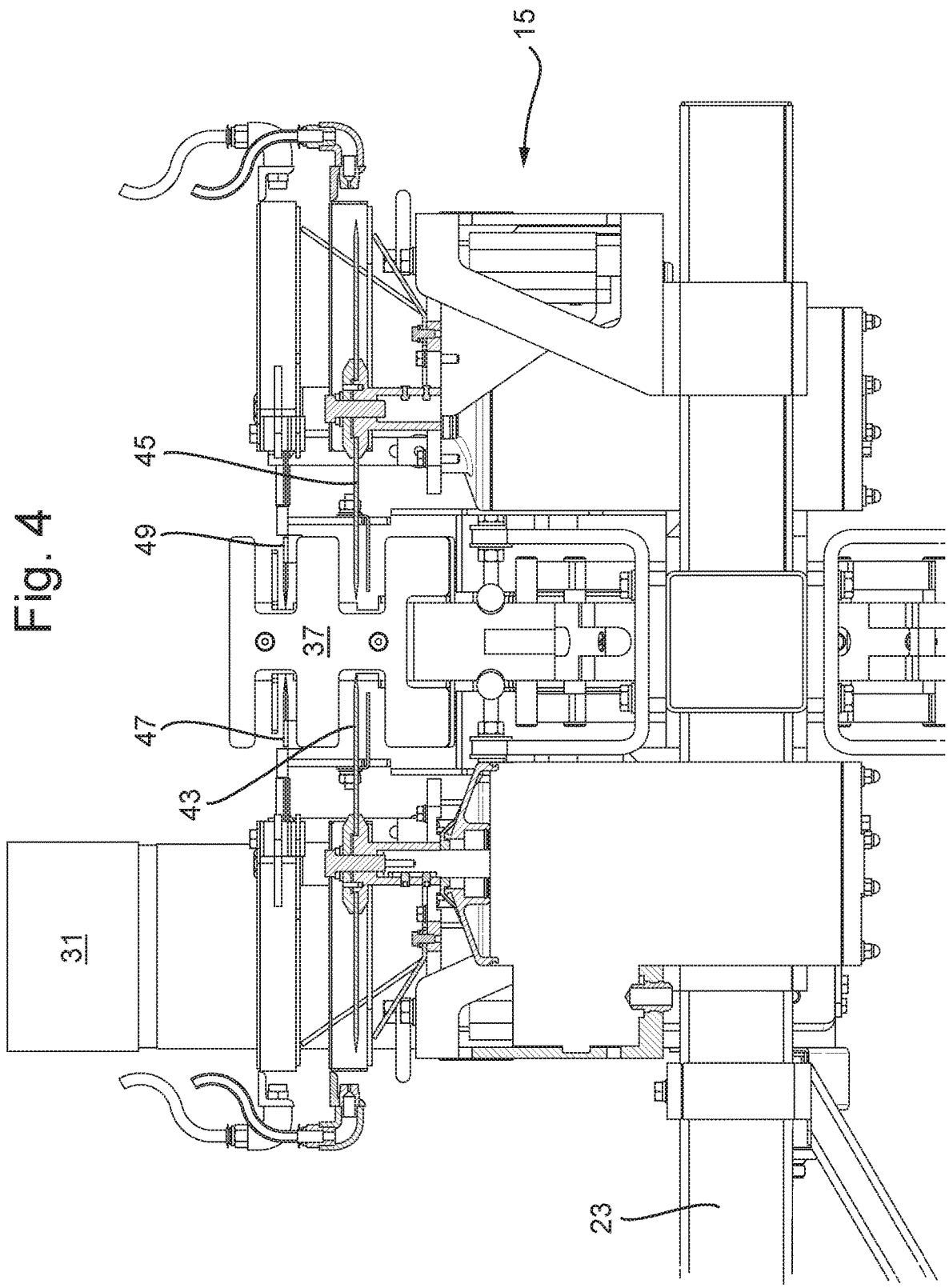
FIG. 4 is an intermediate cross section of the breast cutting unit of FIGS. 2 and 3, as seen in the direction of conveyance (arrow A)

The invention will now further be described in reference to the breast cutter 15, and the thigh cutter 17. As seen in FIG. 2, the breast cutter unit 15 is positioned underneath the overhead conveyor 5, and below a succession of shackles 21 depending therefrom. The shackles 21 are moved along the conveyor 5 in the direction of arrow A. The breast cutter unit 15 is attached to a frame 23 of the apparatus 1, and has an auxiliary conveyor, in this example formed by first and second return sprockets 25, 27 about which an articulated chain 29 extends in an endless loop. Here, the second return sprocket 27 is driven by an electric motor 31 to move the auxiliary conveyor 25, 27, 29 in synchronization with the shackles 21 of the conveyor 5. Associated with articulated members of the articulated chain 29 are a plurality of guiding and locating members 33 for guiding and accurately positioning of depending parts of the carcasses suspended from the shackles 21. Because the carcasses suspended from the shackles 21 have previously been halved by the breast splitter unit 13 a triangular portion 35 of the guiding and locating member 33 will engage between the breast halves when it meets with the carcass halves suspended from a shackle 21. Downstream of the triangular portion 35, the guiding and locating members 33 are each provided with a backup plate 37. Once the guiding and locating member 33 has engaged depending carcass breast halves these will be captured in opposite recesses between the triangular portion 35 and the backup plate 37. When this position has been accomplished, the guiding and locating members 33 will enter between opposite guide rails 39, 41. The upstream ends of the opposite guide rails 39, 41 may have converging end sections as shown in FIG. 2 to assist in capturing the breast halves of the depending carcass halves correctly in the opposite recesses of the guiding and locating members. The depending carcass halves can now be accurately guided and positioned when passing a cutting implement, here a first pair of opposite rotary cutting blades 43, 45 and a second pair of opposite rotary cutting blades 47, 49. As can also be seen in FIG. 2, the backup plates 37 each have lateral cutouts for passing the opposite rotary cutting blades. As shown in FIG. 3 the breast cutter unit 15 may additionally be provided with an entrance guide 51. The electric drive motor 31 may also be positioned vertically, rather than horizontally. In FIG. 4 it is clearly shown how the cutouts in the backup plate 37 pass the successive first pair of cutting blades 43, 45 and second pair of cutting blades 47, 49. As a result of the breast portion already being halved, the cutting operation of the breast cutter unit 15 will yield four separate meat parts by the transverse cutting of the depending breast halves.

Figure 5:
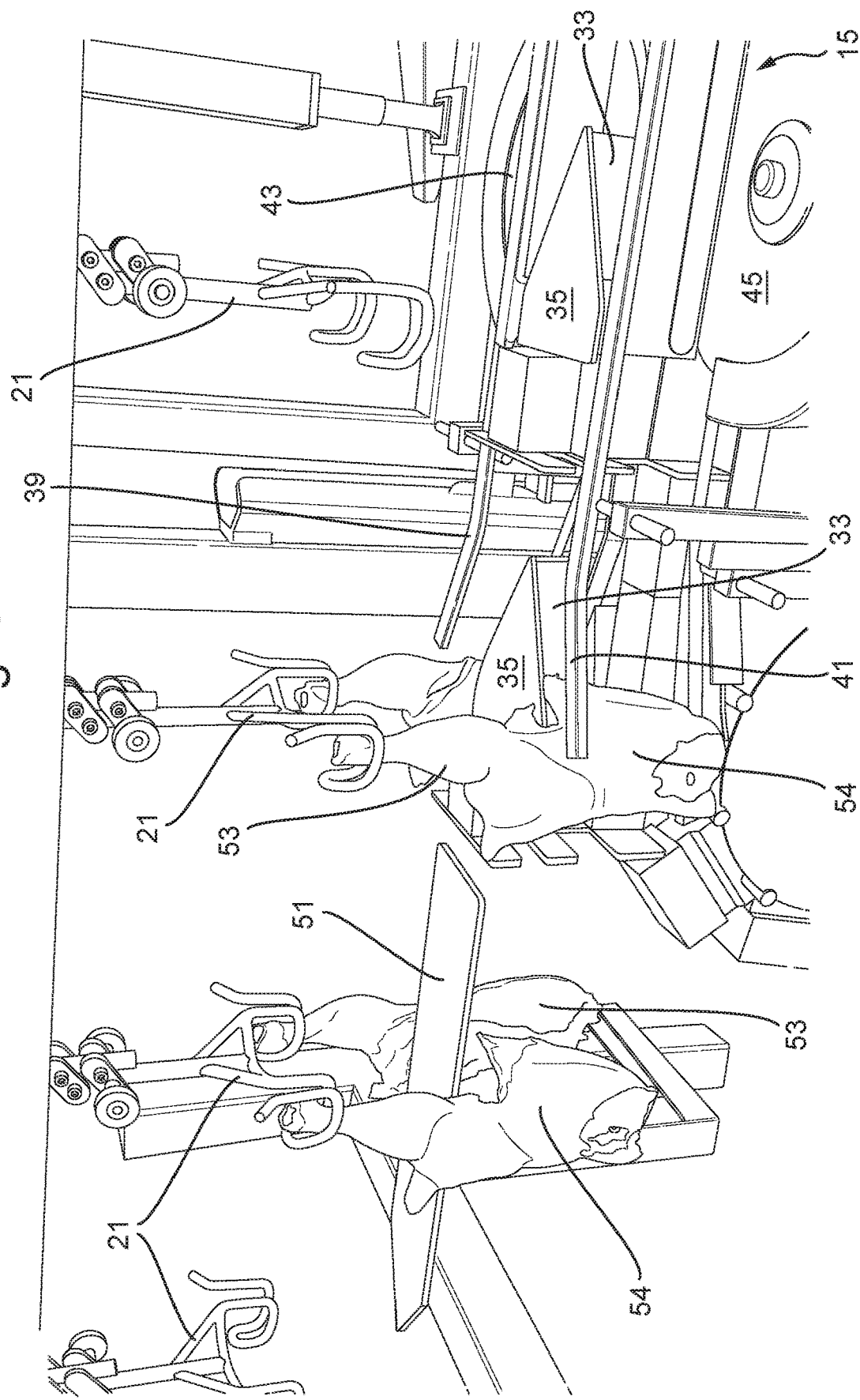
FIG. 5 shows the unit of FIGS. 1-4 in operation for cutting halved poultry breasts of halved suspended carcasses.
Figure 6:
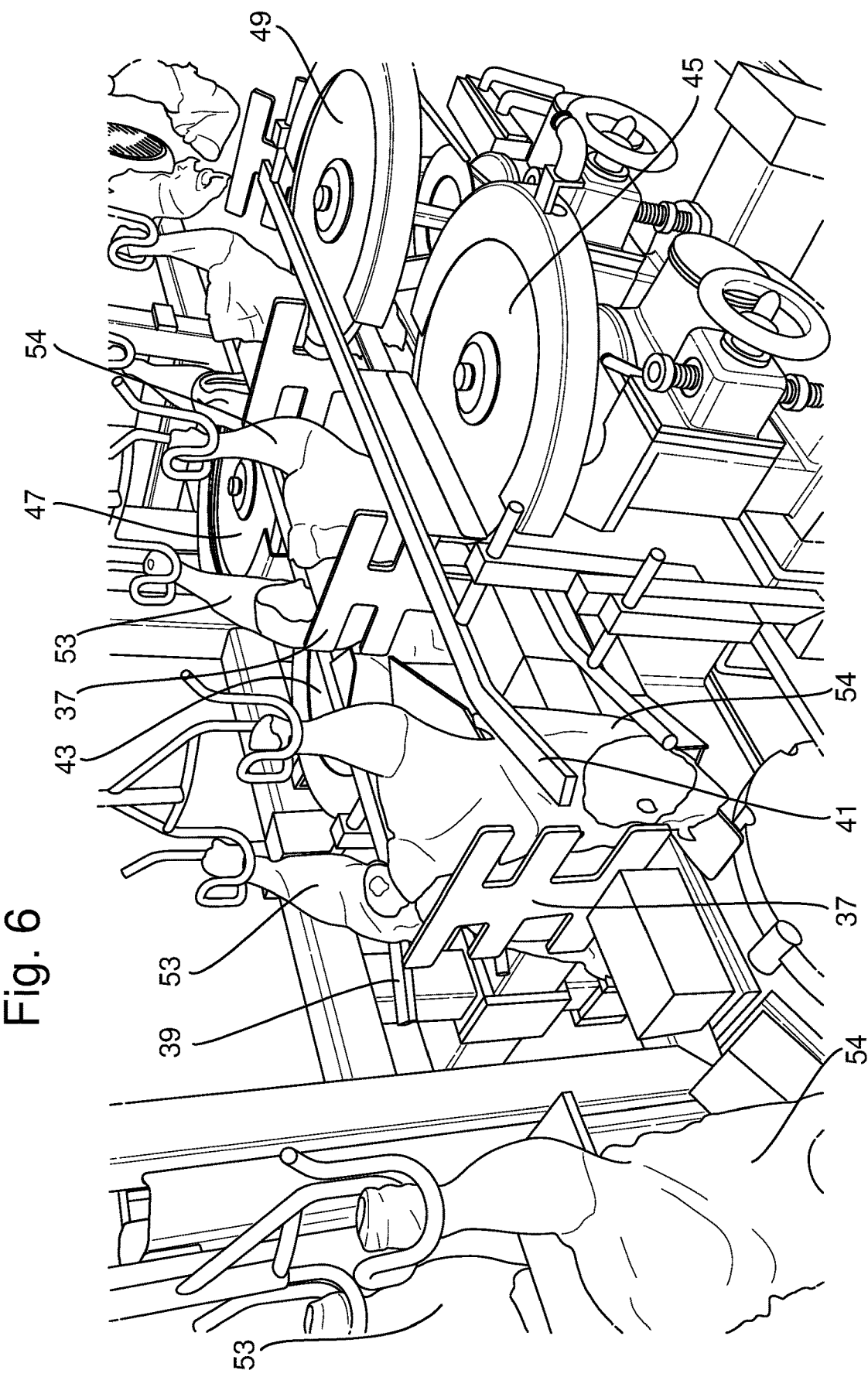
FIG. 6 is another view of the unit of FIGS. 1-5 in operation.
Figure 7:
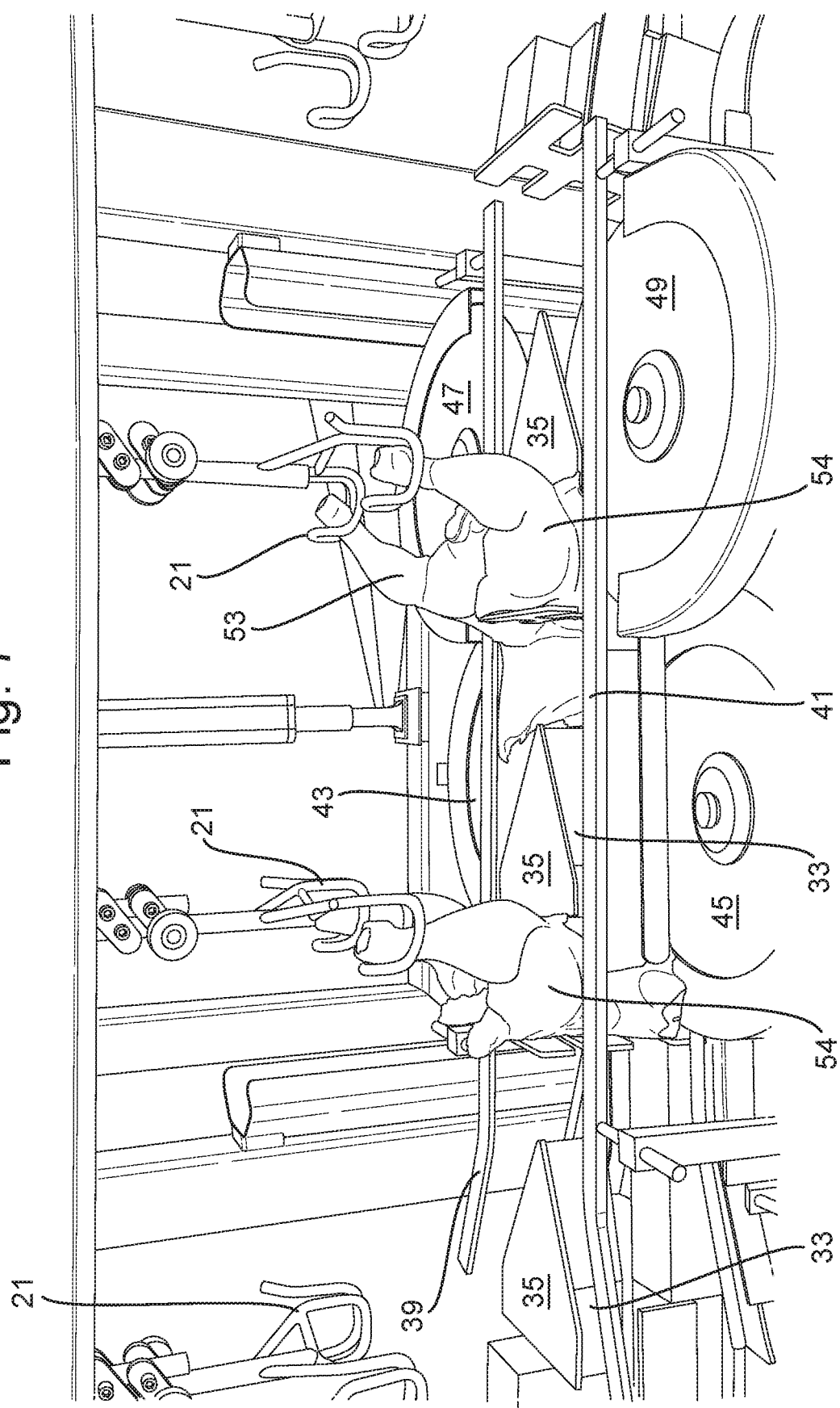
FIG. 7 is yet another view of the unit of FIGS. 1-6 in operation.

The operation of the breast cutter unit 15 is further illustrated in FIGS. 5, 6 and 7. As shown in FIG. 5, carcass halves 53, 54 pass on opposite sides of the entrance guide 51 prior to being engaged by the triangular portion 35 of the guiding and locating member 33 of the breast cutter unit 15. After meeting with the guiding and locating member 33 the carcass halves 53, 54 are guided and captured by the opposite guide rails 39, 41 for engagement by the first pair of opposite rotary cutting blades 43, 45. As further seen in FIG. 6, the carcass halves 53, 54 will be pushed by the backup plates 37 to pass correctly positioned between the first and second pairs of opposite rotating knife blades 43, 45, 47, 49. FIG. 7 shows the engagement of the suspended carcass halves 53, 54 with respectively each of the first pair of rotating knife blades 43, 45, and the second pair of rotating knife blades 47, 49 to obtain the four parts of breast meat.

Figure 8:
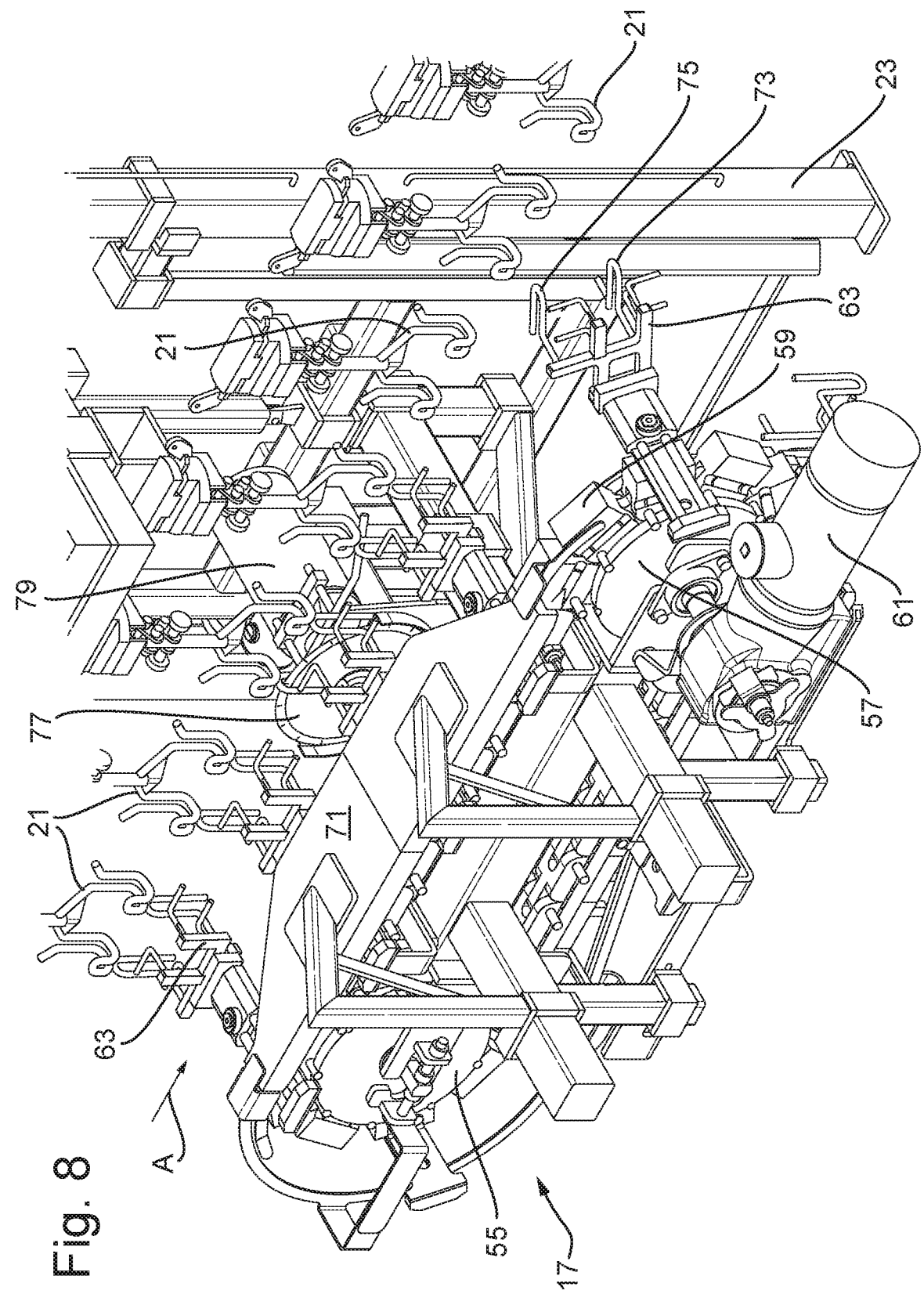
FIG. 8 is an isometric view of a leg cutting unit in accordance with the invention.

Referring now to FIG. 8 it should first be pointed out that between the previous breast cutter unit 15, and the present leg cutter unit 17 the shackles 21, which are indexable, have turned through 90 degrees from the position in which they passed the breast cutter unit 15. Now in this example entering the leg cutter unit 17, in the direction of arrow A, the leg of the carcass halve 53, which was first on the inside of the conveyor 5, will now be a trailing one in the leg cutter unit 17, while the leg of the carcass halve 54, which was first on the outside of the conveyor 5, will now be the leading one.

Figure 9:
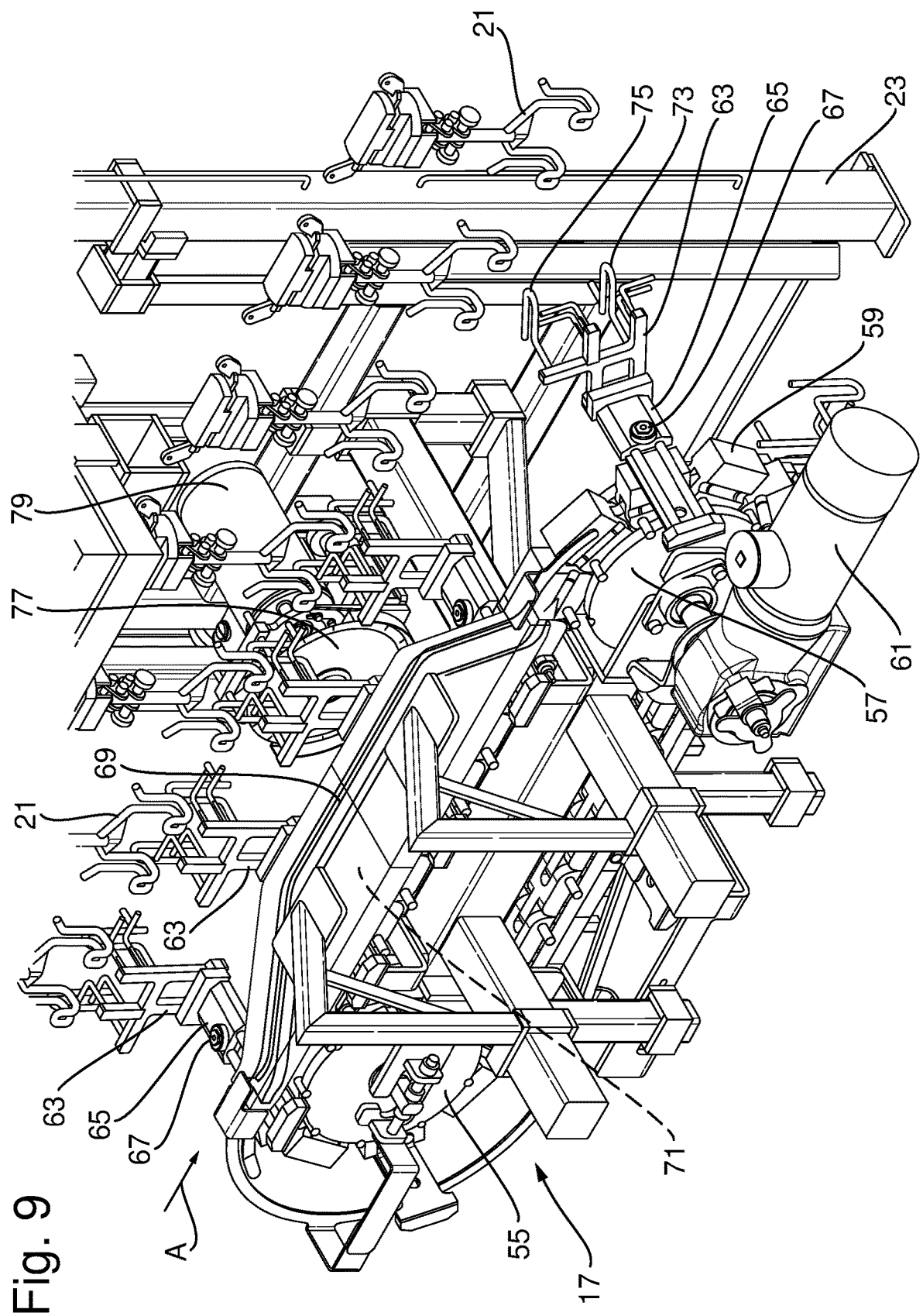
FIG. 9 is a similar view as in FIG. 8, but now with the overhead guide track holder base made transparent to show the guide track.
Figure 10B:
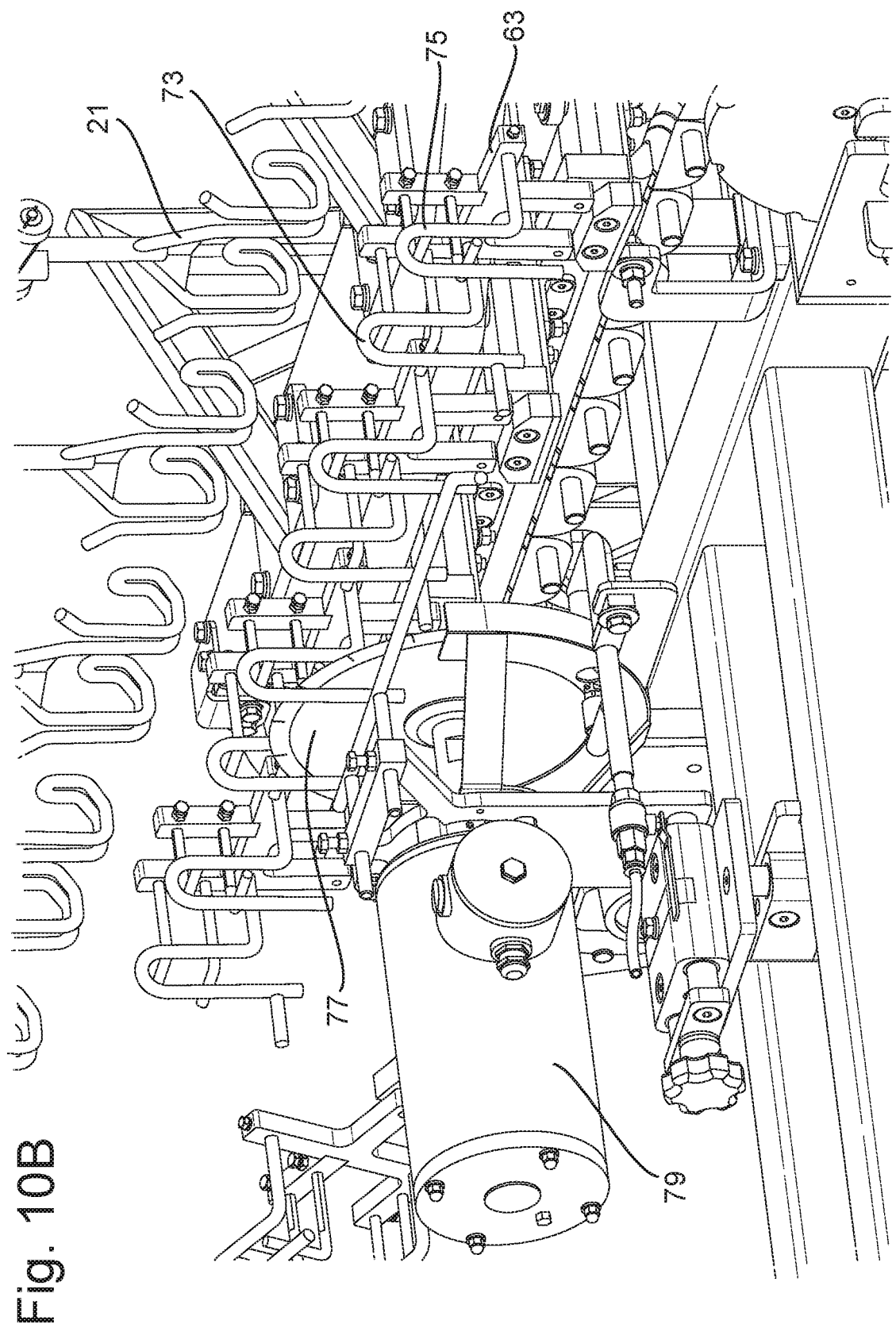
FIG. 10B is an isometric view of the leg cutting unit of FIGS. 8 and 9.

As now further seen in FIGS. 8 and 9 the leg cutter unit 17 is again positioned below the shackles 21 of the endless conveyor (5 in FIG. 1), which moves the shackles 21 in the conveying direction indicated by arrow A. The leg cutter unit 17 is attached to the frame 23 of the apparatus (1 in FIG. 1), and has an auxiliary conveyor, here similar to that of the breast cutter unit 15. The auxiliary conveyor of the leg cutter unit 17 in this example also is formed by first and second return sprockets 55, 57 about which an endless loop of articulated chain 59 extends. Here, the second return sprocket 57 is driven by an electric motor 61, which moves the auxiliary conveyor 55, 57, 59 of the leg cutter unit 17 in synchronization with the shackles 21. Articulated members of the articulated chain 59 are associated with leg positioning guides 63. The leg positioning guides 63 are mounted on sliding blocks 65 which are transversely slidable with respect to the moving direction A of the articulated chain 59. A guide roller 67 mounted on the sliding block 65 engages with a guide track 69 on the underside of a guide track base 71. As the guide track 69 would be invisible in FIG. 8, the guide track base 71 in FIG. 9 is rendered transparent to show the guide track 69 extending along the underside of the guide track base 71. Each of the leg positioning guides 63 has a pair of successive first and second positioning hoops 73, 75. As the electric motor 61 drives the auxiliary conveyor 55, 57, 59 in synchronisation with the shackles 21 the leading leg remains of carcass halve 54 will be engaged by the first positioning hoop 73, while the trailing leg remains of carcass halve 53 will be engaged by the second positioning hoop 75. The positioning hoops 73, 75 are so formed that they pass over a central rotating cutter blade 77, which splits the thigh meat by cutting along the inside bone. The rotating cutter blade 77 is driven by an electric motor 79. FIGS. 10A and 10B show in more detail the position of the positioning hoops 73, 75 when passing over the control rotating cutter blade 77.

Figure 11:
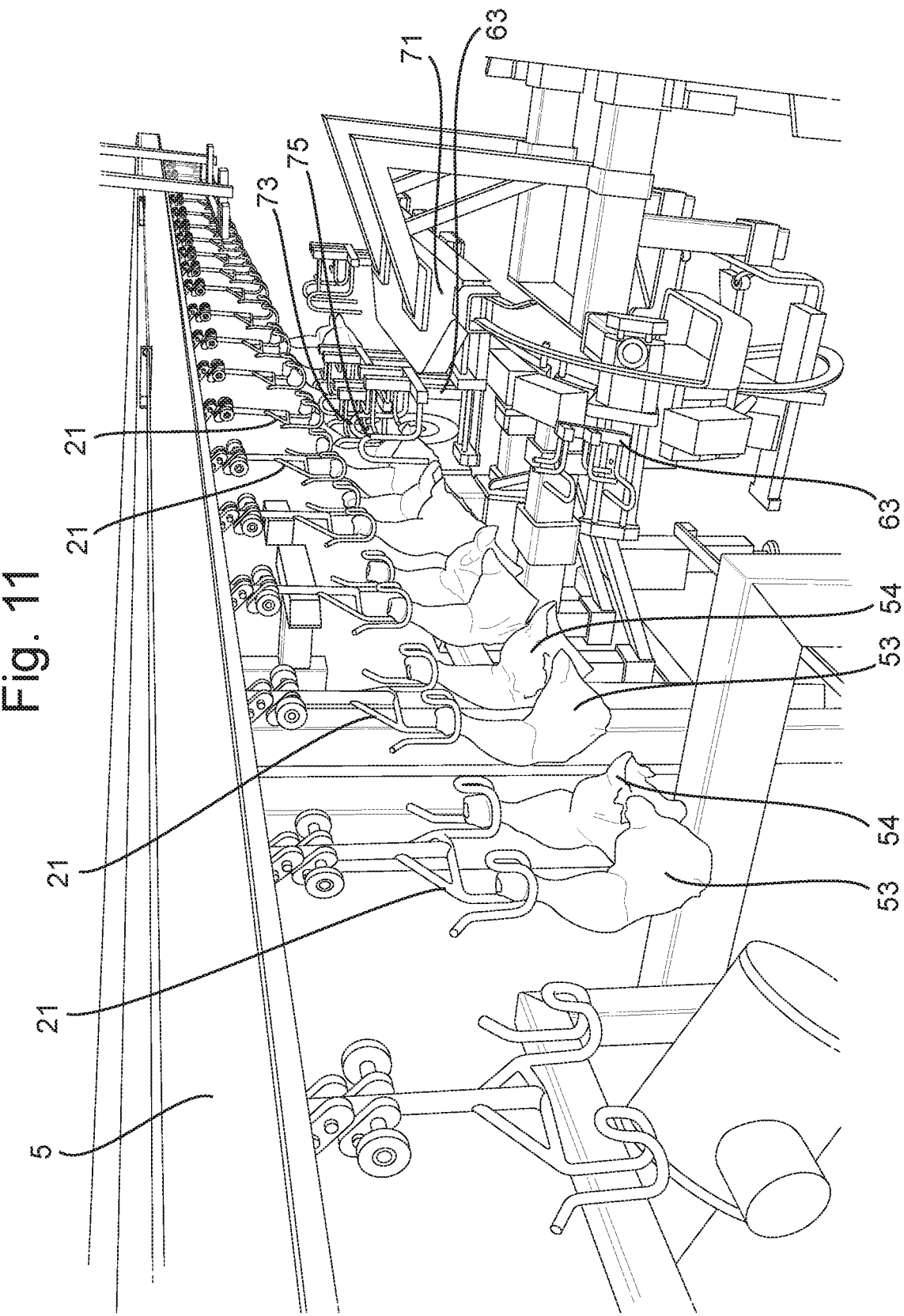
FIG. 11 shows the leg cutting unit of FIGS. 8-10 in operation for longitudinally splitting thigh meat.
Figure 12:
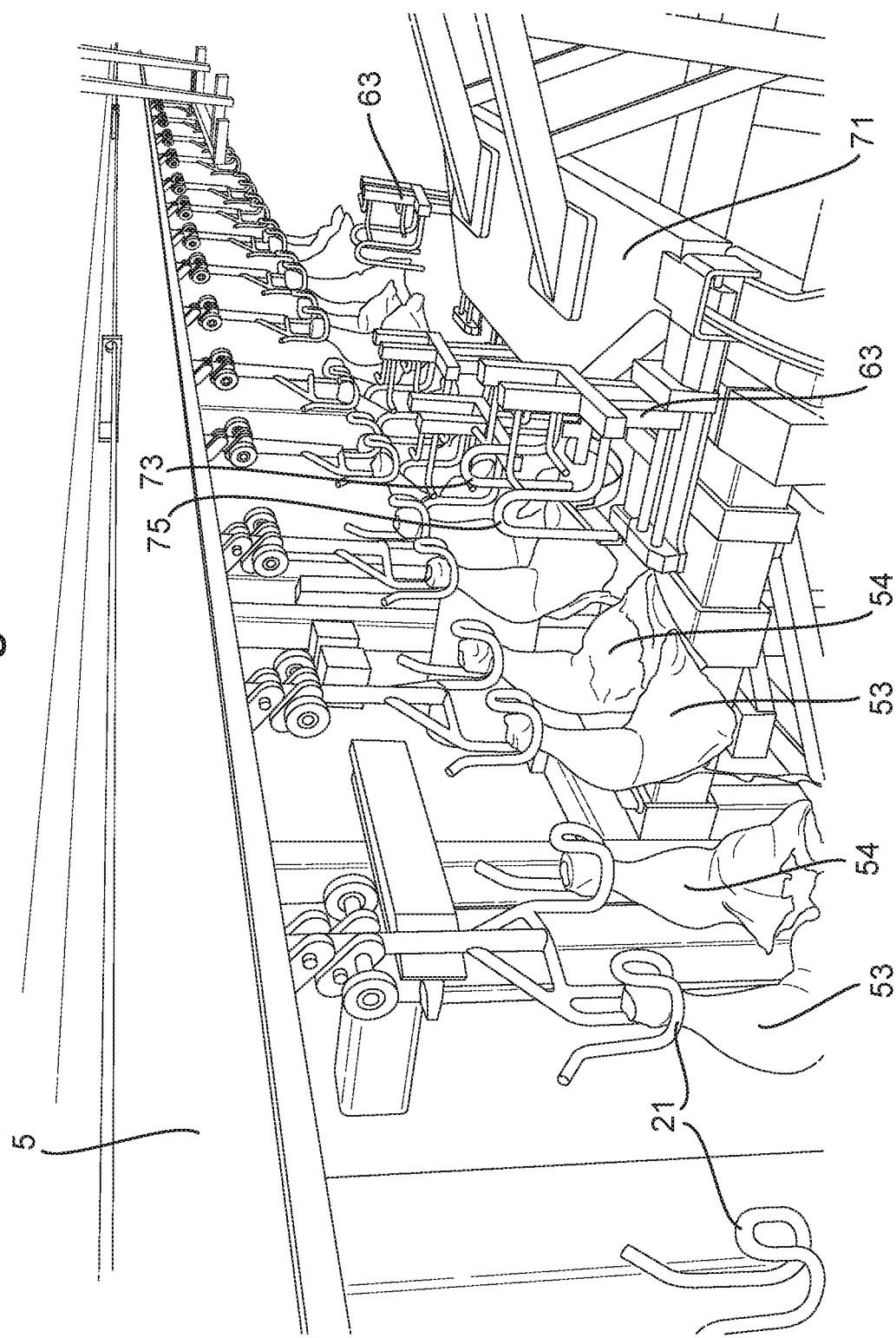
FIG. 12 is another view of the unit of FIGS. 8-11 in operation.

The operation of the leg cutter unit 17 is further illustrated in FIGS. 11, 12 and 13. As shown in FIG. 11 the now leading leg remains of carcass halve 54 will be first engaged by the first positioning hoop 73 of the leg positioning guide 63, followed by engagement of the trailing leg remains of carcass halve 53 being engaged by the second positioning hoop 75 of each leg positioning guide 63. FIG. 12 helps to illustrate the transverse movement of the first and second positioning hoops 73, 75, when moving into and out of engagement with the leading and trailing carcass halves 54, 53. In FIG. 13 the same action is shown as in FIG. 12, but now for clarity without leg remains of leading and trailing carcass halves in some of the shackles.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate examples or embodiments, however, alternative embodiments having combinations of all or some of the features described in these separate embodiments are also envisaged.

In the examples, the leg cutter unit includes a vertically rotating cutter blade. The vertically rotating cutter blade can split the thigh meat in two parts such as two halves, e.g. by cutting along the inside of the thigh bone. The leg positioning guides of the auxiliary conveyor keep the leg, here the thigh portion, positioned relative to the cutter blade. It will be appreciated that it is also possible that alternatively, or additionally, the leg cutter unit includes a horizontally rotating cutter blade or a pair of opposite horizontally rotating cutter blades. The horizontally rotating cutter blade(s) can separate the thigh portion from the drumstick. The leg positioning guides of the auxiliary conveyor can keep the leg, here the thigh portion and the drumstick, positioned relative to the cutter blade. It will be appreciated that it is also possible that the leg cutter unit includes a vertically rotating cutter blade and a horizontally rotating cutter blade (or pair of cutter blades). The horizontally rotating cutter blade(s) can separate the thigh portion from the drumstick. The vertically rotating cutter blade can split the thigh meat in two parts such as two halves, e.g. by cutting along the inside of the thigh bone. The leg positioning guides of the auxiliary conveyor can keep the leg, here the thigh portion and the drumstick, positioned relative to the cutter blades.

It is thus believed that the operation and construction of the present invention will be apparent from the foregoing description and drawings appended thereto. Reference in this specification to any prior publication (or information derived from it), or to any matter which is known, is not, and should not be taken as, an acknowledgement or admission or any form of suggestion that that prior publication (or information derived from it) or known matter forms part of the common general knowledge in the field of endeavour to which this specification relates. For the purpose of clarity and a concise description features are described herein as part of the same or separate embodiments, however, it will be appreciated that the scope of the invention may include embodiments having combinations of all or some of the features described. References to published material or sources of information contained in the text should not be construed as concession that this material or information was part of the common general knowledge in this country or abroad. Each document, reference or patent publication cited in this text should be read and considered by the reader as part of this text, and for reasons of conciseness the contents thereof is not repeated, duplicated or copied in this text. It will be clear to the skilled person that the invention is not limited to any embodiment herein described and that modifications are possible which may be considered within the scope of the appended claims. Also kinematic inversions are considered inherently disclosed and can be within the scope of the invention. In the claims, any reference signs shall not be construed as limiting the claim. The terms 'comprise', 'comprising' and 'including' when used in this description or the appended claims should not be construed in an exclusive or exhaustive sense but rather in an inclusive sense. Thus expression as 'including' or 'comprising' as used herein does not exclude the presence of other elements, integers, additional structure or additional acts or steps in addition to those listed. Furthermore, the words 'a' and 'an' shall not be construed as limited to 'only one', but instead are used to mean 'at least one', and do not exclude a plurality. Features that are not specifically or explicitly described or claimed may additionally be included in the structure of the invention without departing from its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. To the extend that structure, material, or acts are considered to be essential they are inexpressively indicated as such. Additions, deletions, and modifications within the purview of the skilled person may generally be made without departing from the scope of the invention, as determined by the claims.

The invention claimed is:

1. A cutting unit for cutting meat parts from suspended previously eviscerated poultry carcasses, when the carcasses are each suspended upside-down by their legs from a shackle in an overhead conveyor that transports a succession of shackles through poultry cut-up apparatus, the cutting unit including:
   at least one cutting element; and
   a guiding and positioning member for guiding and positioning a predetermined portion of a poultry carcass in respect of the at least one cutting element, wherein the guiding and positioning member is associated with an auxiliary conveyor adapted to move synchronously with shackles in an overhead conveyor, wherein the auxiliary conveyor has an endless chain articulated about first and second return sprockets, and wherein the articulated chain moves in a vertical plane parallel to a vertical plane common to a path of movement of the conveyor shackles.

2. The cutting unit as in claim 1, wherein the cutting element is a rotating cutter blade.

3. The cutting unit as in claim 2, wherein the rotating cutter blade rotates in a vertical plane.

4. The cutting unit as in claim 2, wherein the cutting unit is a leg cutter unit, and the guiding and positioning member is a leg positioning guide for positioning a thigh portion of the leg in respect of the vertically rotating cutter blade.

5. The cutting unit as in claim 4, wherein the leg positioning guide is additionally arranged for movement laterally of the vertical plane.

6. The cutting unit as in claim 2, wherein the rotating cutter blade rotates in a horizontal plane.

7. The cutting unit as in claim 6, wherein the horizontally rotating cutter blade is part of a pair of opposite rotary cutter blades.

8. The cutting unit as in claim 7, wherein the cutting unit is a breast cutting unit, wherein the cutting unit is a breast cutter unit, and wherein the guiding and positioning member is a guiding and locating member for locating and guiding a breast portion between the pair of opposite rotary cutter blades.

9. The cutting unit as in claim 1, wherein the cutting unit is a leg cutter unit, including a rotating cutter blade, or a pair of rotating cutter blades, arranged to rotate in a horizontal plane.

10. The cutting unit as in claim 1, wherein the cutting unit is a leg cutting unit including a first rotating cutter blade arranged to rotate in a vertical plane, and a second rotating cutter blade, or a pair of second rotating cutter blades, arranged to rotate in a horizontal plane.

11. An automatic poultry cut-up apparatus including a cutting unit according to claim 1.

12. A method for cutting meat parts from suspended previously eviscerated poultry carcasses, when the carcasses are each suspended upside-down by their legs from a shackle in an overhead conveyor that transports a succession of shackles through poultry cut-up apparatus, the method including:
  transporting, using the shackles, a suspended carcass past at least one cutting element;
  guiding and positioning a predetermined portion of the carcass in respect of the at least one cutting element by engaging the carcass with a guiding and positioning member associated with an auxiliary conveyor adapted to move the guiding and positioning member synchronously with the shackles.

13. The method of claim 12, including cutting the meat parts from the suspended previously eviscerated poultry carcasses in substantially equally divided portions regarding weight and/or size.

14. The method of claim 12, wherein the guiding and positioning member moves in a vertical plane parallel to a vertical plane common to a path of movement of the conveyor shackles.

15. The method according to claim 12, wherein the auxiliary conveyor has an endless chain articulated about first and second return sprockets.

16. The method according to claim 12, wherein the cutting element includes a vertically rotating cutter blade.

17. The method according to claim 12, wherein the cutting element, includes a horizontally rotating cutter blade, or a pair of horizontally rotating cutter blades.

18. The method according to claim 12, including cutting meat parts from breast portions of the carcasses.

19. The method according to claim 12, including cutting a thigh portion of a leg of the carcass in two parts, e.g. two halves.

20. The method according to claim 12, including separating a thigh portion from a drumstick of a leg of the carcass.

* * * * *